(12) United States Patent
Wu et al.

(10) Patent No.: US 10,491,006 B2
(45) Date of Patent: Nov. 26, 2019

(54) HAND-HELD APPARATUS AND METHOD FOR POWER CHARGING MANAGEMENT THEREOF

(71) Applicant: HTC CORPORATION, Taoyuan (TW)

(72) Inventors: Chuan-Li Wu, Taoyuan (TW);
Chia-Ming Chang, Taoyuan (TW);
Shih-Ping Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 116 days.

(21) Appl. No.: 15/785,432

(22) Filed: Oct. 17, 2017

(65) Prior Publication Data
US 2019/0115764 A1    Apr. 18, 2019

(51) Int. Cl.
*H02J 7/00*    (2006.01)

(52) U.S. Cl.
CPC .......... *H02J 7/0008* (2013.01); *H02J 7/0091* (2013.01)

(58) Field of Classification Search
CPC ....... H02J 2007/0059; H02J 2007/0062; H02J 7/0052; H02J 7/00; H02J 7/0055; H02J 7/007; H02J 7/008; H02J 7/0091; H02J 7/0093; H02J 7/022; H02J 7/047; H02J 7/0072; H02J 7/04; H02J 7/045; H02J 7/0008; H02M 3/156; H02M 2001/0045; B82Y 20/00; H01S 5/0208; H01S 5/02248; H01S 5/0427; H01S 5/0622; H01S 5/18311; H01S 5/18341; H01S 5/18358; H01S 5/18369; H01S 5/34306; B41J 2002/14403; B41J 2202/20; B41J 2/0451; B41J 2/04515; B41J 2/04541; B41J 2/04545; B41J 2/04551; B41J 2/04563;
(Continued)

(56) References Cited

U.S. PATENT DOCUMENTS

2015/0229155 A1* 8/2015 Sporck .................. H02J 7/0073
                                                              320/107
2017/0085098 A1* 3/2017 Sporck .................... H02J 7/007

FOREIGN PATENT DOCUMENTS

CN        101142734         3/2008

OTHER PUBLICATIONS

"Office Action of Taiwan Counterpart Application", dated Jun. 20, 2018, p. 1-p. 7.

* cited by examiner

*Primary Examiner* — Vuthe Siek
(74) *Attorney, Agent, or Firm* — JCIPRNET (57) ABSTRACT

A hand-held apparatus and a method for power charging management thereof are provided. The method for power charging management includes: providing a power charging voltage and a power charging current to perform a power charging process to the hand-held apparatus, and simultaneously detecting a surface temperature of the hand-held apparatus during the power charging process; activating a power charging management mechanism when the surface temperature is higher than a reference temperature, and simultaneously reducing a voltage value of the power charging voltage; and generating a comparing result by comparing the surface temperature with a plurality of threshold temperatures after the power charging management mechanism is activated, and adjusting a current value of the power charging current based on the comparing result. The reference temperature is lower than the plurality of threshold temperatures and values of the plurality of threshold temperatures are not the same.

11 Claims, 6 Drawing Sheets

(58) Field of Classification Search
CPC .... B41J 2/0457; B41J 2/0458; B41J 2/04591; B41J 2/04596; B41J 2/1404; H03K 7/08
See application file for complete search history.

HAND-HELD APPARATUS AND METHOD FOR POWER CHARGING MANAGEMENT THEREOF

BACKGROUND OF THE INVENTION

Field of the Invention

The invention relates to a hand-held apparatus and a method for power charging management thereof, particularly a hand-held apparatus performing power charging based on a multistage temperature detection, and a method for power charging management thereof.

Description of Related Art

With the generalization of electronic devices, smart electronic devices become the tools essential to people's daily lives. Hence, increasing the working time of smart electronic devices has become an important topic for designers.

In-built high capacity batteries are used in the current smart electronic devices to prolong the working times of the batteries. Hence, rapid power charging has become a trended function for smart electronic devices. The processor operating rapid calculation significantly increases the power consumption of smart electronic devices. Accompanied with the overheating caused by rapid charging, smart electronic devices suffer more and more from malfunction due to overheating. Additionally, being continuously exposed in a high-temperature environment not only increases the resistance of the interior semiconductor components of the smart electronic devices and the chances of malfunctioning, but also enlarges the aging scale of batteries. The life cycles of smart electronic devices are thus drastically shortened. Moreover, the aforementioned problem on high temperature could raise concerns on safety to users and further influence consumers' faith in the products and the producers.

SUMMARY OF THE INVENTION

A hand-held apparatus and a method for power charging management thereof are provided in this invention and power charging efficiency may be effectively increased.

The method for power charging management of the invention is adapted to be applied in a hand-held apparatus including: providing a power charging voltage and a power charging current to perform a power charging process to the hand-held apparatus, and simultaneously detecting a surface temperature of the hand-held apparatus during the power charging process; activating a power charging management mechanism when the surface temperature is higher than a reference temperature, and simultaneously reducing a voltage value of the power charging voltage; and generating a comparing result by comparing the surface temperature with a plurality of threshold temperatures after the power charging management mechanism is activated, and adjusting a current value of the power charging current based on the comparing result, wherein a current value of the power charging current is increased based on the comparing result when the surface temperature drops from a first threshold temperature higher than the plurality of threshold temperatures to be lower than the first threshold temperature, wherein the reference temperature is lower than the plurality of threshold temperatures, temperature values of the plurality of threshold temperatures are not the same.

The hand-held apparatus of this invention includes a casing, a battery, a temperature sensor, and a controller. The battery is accommodated in the casing. The temperature sensor is coupled to the casing and detect a surface temperature of the casing. The controller is accommodated in the casing and is coupled to the battery and the temperature sensor. The controller is configured to provide a power charging voltage and a power charging current to perform a power charging process to the battery, and receive the surface temperature provided by the temperature sensor during the power charging process; activate a power charging management mechanism when the surface temperature is higher than a reference temperature, and simultaneously reduce a voltage value of the power charging voltage; and generate a comparing result by comparing the surface temperature with a plurality of threshold temperatures after the power charging management mechanism is activated, and adjust a current value of the power charging current based on the comparing result, wherein the controller increases a current value of the power charging current based on a corresponding comparing result of the comparing result when the surface temperature drops from a first threshold temperature higher than the plurality of threshold temperatures to be lower than the first threshold temperature, wherein the reference temperature is lower than the plurality of threshold temperatures and temperature values of the threshold temperatures are not the same.

Based on the above, in this invention, when the hand-held apparatus performs a power charging process, the surface temperature of the hand-held apparatus is detected, surface temperature is compared with the reference temperature and the plurality of threshold temperatures, and the values of the power charging voltage and the power charging current provided during the power charging process are adjusted based on the comparing result. The power charging efficiency of the battery of the hand-held apparatus is effectively increased without overheating. The hand-held apparatus may further simultaneously perform a regular operation when performing a power charging process.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
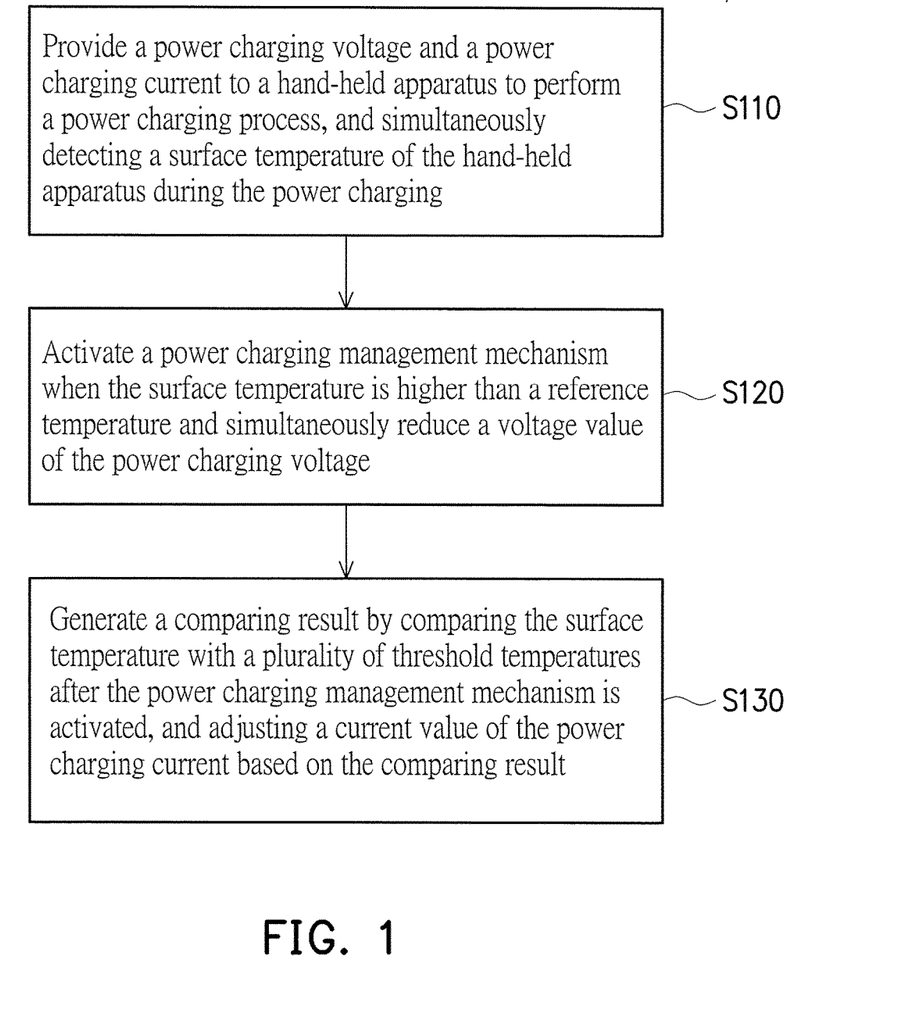
FIG. 1 is a flow chart illustrating a method for power charging management in an embodiment of the invention.

Referring to FIG. 1, FIG. 1 is a flow chart illustrating a method for power charging management in an embodiment of the invention. The method for power charging management of FIG. 1 is adapted to be applied in a hand-held apparatus, wherein in a step S110, a power charging voltage and a power charging current are provided to the hand-held apparatus such that a power charging process is performed, and a surface temperature of the hand-held apparatus is simultaneously detected during the power charging process. Then, in a step S120, a power charging management mechanism is activated when the surface temperature is higher than a reference temperature, and a voltage value of the power charging voltage is simultaneously reduced. Moreover, in a step S130, a comparing result is generated by comparing the surface temperature with a plurality of threshold temperatures after the power charging management mechanism is activate, and a current value of the power charging current is adjusted based on the comparing result.

To further explain, when the hand-held apparatus receives a power source to perform a power charging process, the hand-held apparatus may provide a power charging voltage and a power charging current based on the electric source received to perform a power charging process to the battery. Moreover, during the power charging process, the hand-held apparatus may detect a surface temperature of an outer casing of the hand-held apparatus. It should be noted that the hand-held apparatus may stay in an operation mode during the power charging process. In other embodiments of the invention, the hand-held apparatus may also be in a stand-by mode or an off mode during the power charging process.

During an initial time of performing the power charging process, a surface temperature of the hand-held apparatus is relatively low and is lower than a pre-set reference temperature. At this time, the hand-held apparatus may provide a relatively high power charging voltage and a relatively high power charging current based on power charging specification of the hand-held apparatus to perform a power charging process to the battery. As the power charging process proceeds, the surface temperature may gradually increase. The comparison in the step S120 is performed between the surface temperature and the reference temperature, and the power charging management mechanism is activated when the surface temperature is higher than the reference temperature. Moreover, the hand-held apparatus simultaneously reduces a voltage value of the power charging voltage when the power charging mechanism is activated.

In the step S120, the surface temperature of the hand-held apparatus is reduced by adjusting the voltage value of the power charging voltage from a first voltage value to a second voltage value. Moreover, the hand-held apparatus may meanwhile further reduce a current value of the power charging current so as to increase a reducing trend of the surface temperature of the hand-held apparatus.

After the step S120, the surface temperature is continued to be detected in the step S130. Moreover, on the condition of the power charging management mechanism is activated, a plurality of threshold temperatures of different values may be set in the hand-held apparatus, and the plurality of threshold temperatures set are all higher than the reference temperature. In the step S130, the hand-held apparatus compares the surface temperature with the reference temperature and adjusts the power charging current based on a comparing result.

It should be mentioned that when the surface temperature drops from a first threshold temperature higher than the plurality of threshold temperatures to be lower than the first threshold temperature, the hand-held apparatus may increase a current value of the power charging current so as to provide better power charging effectiveness.

Figure 2:
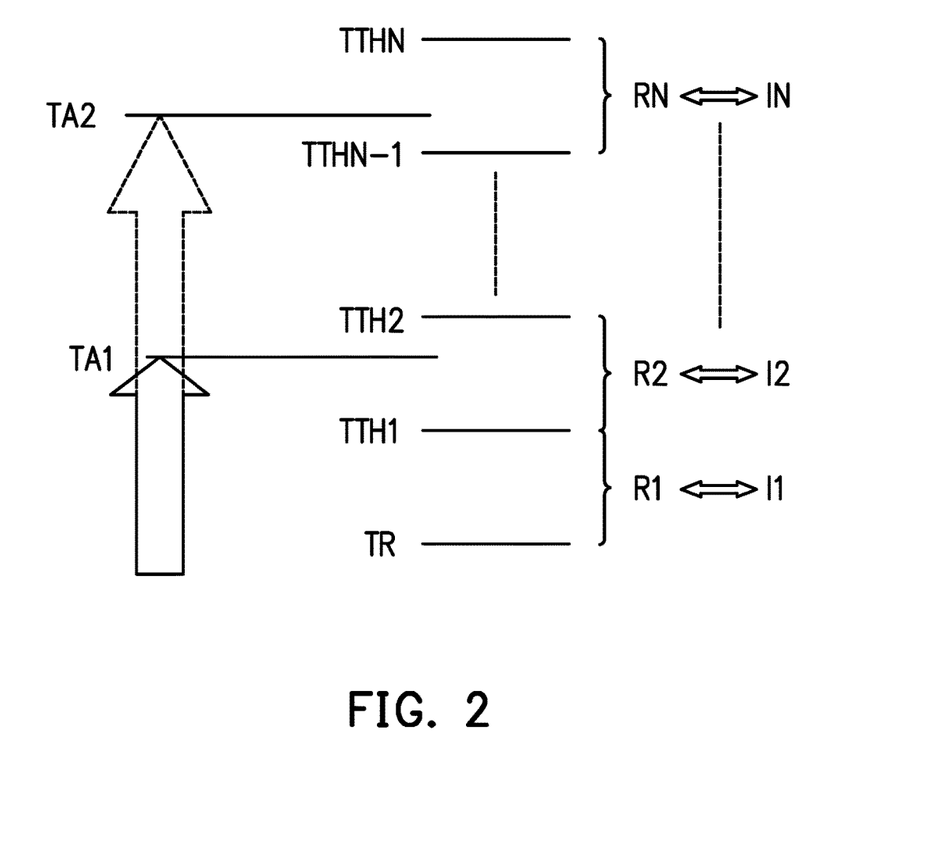
FIG. 2 is a schematic illustrating a method for adjusting a power charging current in an embodiment of the invention.

More specifically, referring to FIG. 1 and FIG. 2 together, FIG. 2 is a schematic illustrating a method for adjusting a power charging current in an embodiment of the invention. A reference temperature TR and a plurality of threshold temperatures TTH1 to TTHN are set in the hand-held apparatus, wherein the threshold temperature TTHN>TTHN−1> . . . >TTH2>TTH1>the reference temperature TR. The threshold temperatures TTH1 to TTHN may form a plurality of temperature ranges R1 to RN based on values of the threshold temperatures, wherein temperature values of the temperature ranges R1 to RN are respectively corresponding to a plurality of set currents I1 to IN. Temperature values of the temperature ranges R1 to RN are negatively correlated with current values of corresponding set currents I1 to IN of the set currents I1 to IN. That is to say, the set current I1>I2> . . . >IN.

In detail, the temperature range R1 lower than the threshold temperature TTH1 (but higher than the reference temperature TR) is corresponding to the set current I1. The temperature range R2 higher than the threshold temperature TTH1 but lower than the threshold temperature TTH2 is corresponding to the set current I2. In this manner, the temperature range RN higher than the threshold temperature TTHN−1 but lower than the threshold temperature TTHN may be corresponding to the set current IN. On the premise of the power charging management mechanism being activated, a surface temperature Ts of the hand-held apparatus is higher than the reference temperature TR. Through continuous detection on the surface temperature, the hand-held apparatus may determine that the surface temperature Ts falls in the temperature range R2 when the surface temperature Ts continues to rise and rises to a temperature TA1. The hand-held apparatus may select the temperature range R2 as a set temperature range and adjust a current value of the power charging current to be equal to the set current I2 by searching for a set current (equal to the setting current I2) corresponding to the set temperature range (the temperature range R2).

If the surface temperature Ts of the hand-held apparatus still continues to rise until equaling a temperature TA2, the hand-held apparatus may determine that the surface temperature Ts falls in the temperature range RN. The hand-held apparatus may select the temperature range RN as a set temperature range and adjust the power charging current from the set current I2 to drop to a set current IN by searching for the set current IN corresponding to the temperature range RN.

It should be noted that in this embodiment, the hand-held apparatus may determine a temperature range to which the surface temperature Ts increases or drops, and decrease or increase a value of the power charging current based on a set current corresponding to the temperature range. The hand-held apparatus may optimize the power charging efficiency of the power charging process without having the surface temperature run overly high. That is to say, the efficiency of the power charging process of the hand-held apparatus may still be optimized in this embodiment of the invention and the power charging process to the battery may be rapidly completed without interrupting user's regular use of the hand-held apparatus.

Figure 3A:
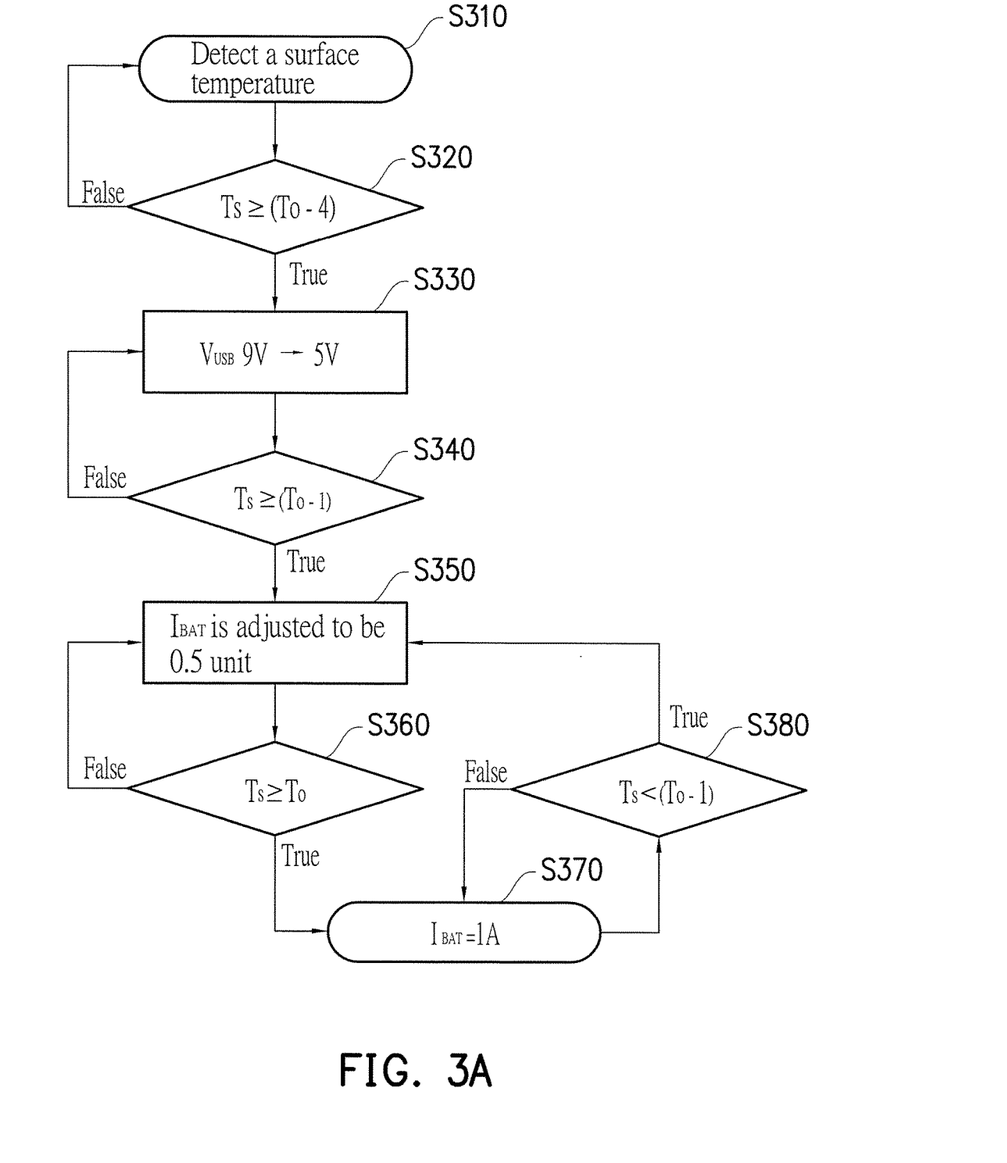
FIG. 3A is a flow chart illustrating a method for power charging management in another embodiment of the invention.
Figure 3B:
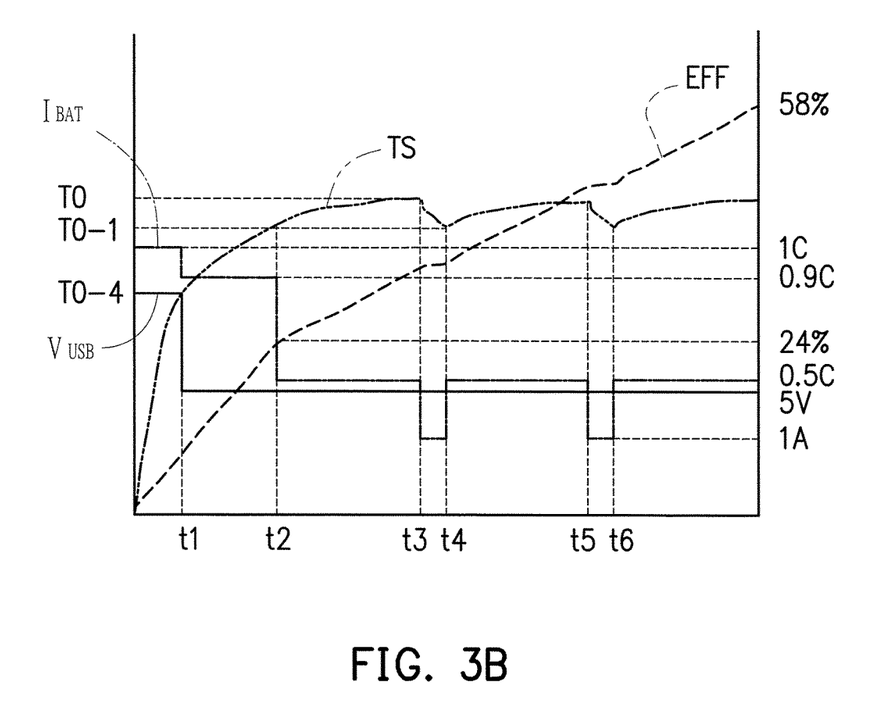
FIG. 3B is an oscillogram illustrating the embodiment of FIG. 3A.

Referring to FIG. 3A and FIG. 3B hereinafter, FIG. 3A is a flow chart illustrating a method for power charging management in another embodiment of the invention, and FIG. 3B is an oscillogram of the embodiment of FIG. 3A. In FIG. 3A, a detecting process on the surface temperature of the hand-held apparatus is activated in a step S310. In a step S320, it is determined if the surface temperature Ts is higher than or equal to the reference temperature. Here, the surface temperature Ts may be set based on a temperature datum To, wherein the surface temperature Ts equals the temperature datum To−4 in this embodiment.

If a determining result of the step S320 is negative, the step S310 and the step S320 are repeatedly performed. On the contrary, if a determining result of the step S320 is positive, a power charging voltage $V_{USB}$ is reduced (e.g. from 9V to 5V, in a step S330). Then, a step S340 is performed to compare if the surface temperature Ts is higher than or equal to the first threshold temperature (=To−1). When the surface temperature Ts is lower than the first threshold temperature, the step S330 and the step S340 are repeatedly performed. On the contrary, when the surface temperature Ts is not lower than the first threshold temperature, one unit of power charging current $I_{BAT}$ is adjusted to 0.5 unit.

Then in a step S360, it is detected if the surface temperature Ts is higher than or equal to a second threshold temperature (=To). When a determining result of the step S360 is negative, the step S350 and the step S360 are repeatedly performed. On the contrary, if a determining result of the step S360 is positive, a step S370 is performed to further reduce the power charging current $I_{BAT}$ to 1 ampere (smaller than 0.5 unit).

Additionally, a step S380 is performed to continuously detect if the surface temperature Ts drops to be lower than the first threshold temperature (=To−1). If a determining result is positive, the step S350 may be performed to adjust the power charging current $I_{BAT}$ to increase to 0.5 unit. If a determining result is negative, the power charging current $I_{BAT}$ is maintained at 1 ampere and the power charging process is performed.

Comparing with the steps in FIG. 3A, one can know that the surface temperature Ts starts to exceed the reference temperature (=To−4), the power charging voltage VBUS is reduced to 5V, and the power charging current IBAT is reduced from one unit (1C) to 0.9 unit (0.9C) when at a time point t1 in FIG. 3B. Meanwhile, the power charging management mechanism is activated. When at a time point t2, the surface temperature Ts starts to exceed the first threshold temperature (=To−1), the power charging current IBAT is reduced to 0.5 unit (0.5C), and an increasing speed of the surface temperature Ts is slowed down.

Then, when at a time point t3, the surface temperature Ts equals the second threshold temperature (=To), the power charging current $I_{BAT}$ is further reduced to 1 ampere, and the surface temperature Ts starts to drop. When at a time point t4, the surface temperature Ts drops to be no higher than the first threshold temperature and the power charging current $I_{BAT}$ is re-adjusted to 0.5 unit.

When at the following time points t5 and t6, the power charging current $I_{BAT}$ is adjusted to vary between 0.5 unit to 1 ampere based on the surface temperature Ts until the power charging process is completed.

In this embodiment, a power charging rate of the battery may be acquired from a curve line EFF. In FIG. 3B, the battery is rapidly charged to 58%.

Incidentally, the adjusting values of the power charging voltage $I_{BAT}$ and the power charging current $V_{BUS}$ in the embodiment are given as examples. Designers may set the adjusting values of the power charging voltage $I_{BAT}$ and the power charging current $V_{BUS}$ according to the actual operation status and requirements of a system. The invention is not limited thereto.

Figure 4A:
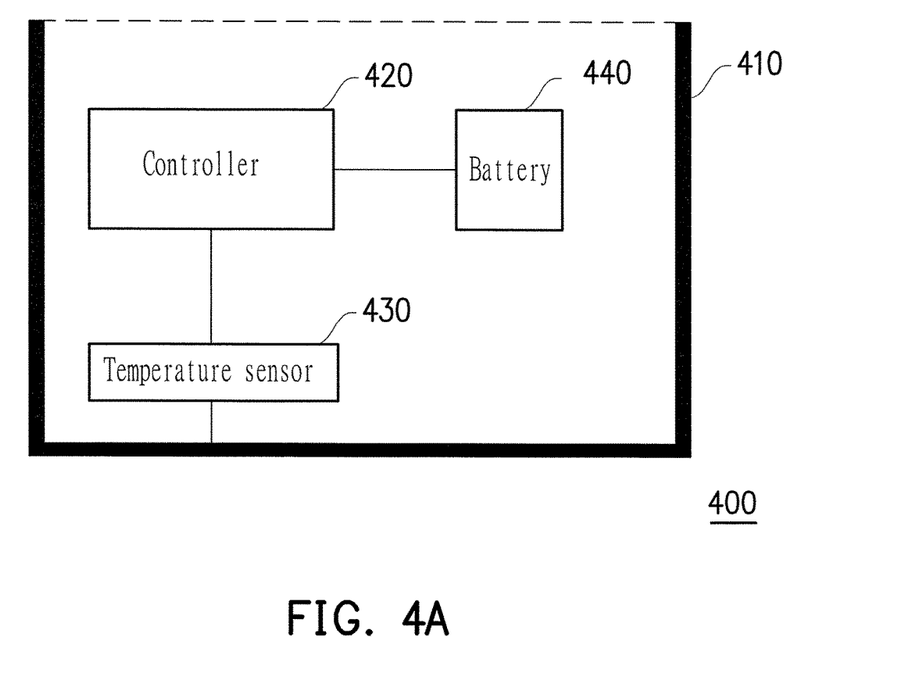
FIG. 4A is a schematic illustrating a hand-held apparatus in an embodiment of the invention.
Figure 4B:
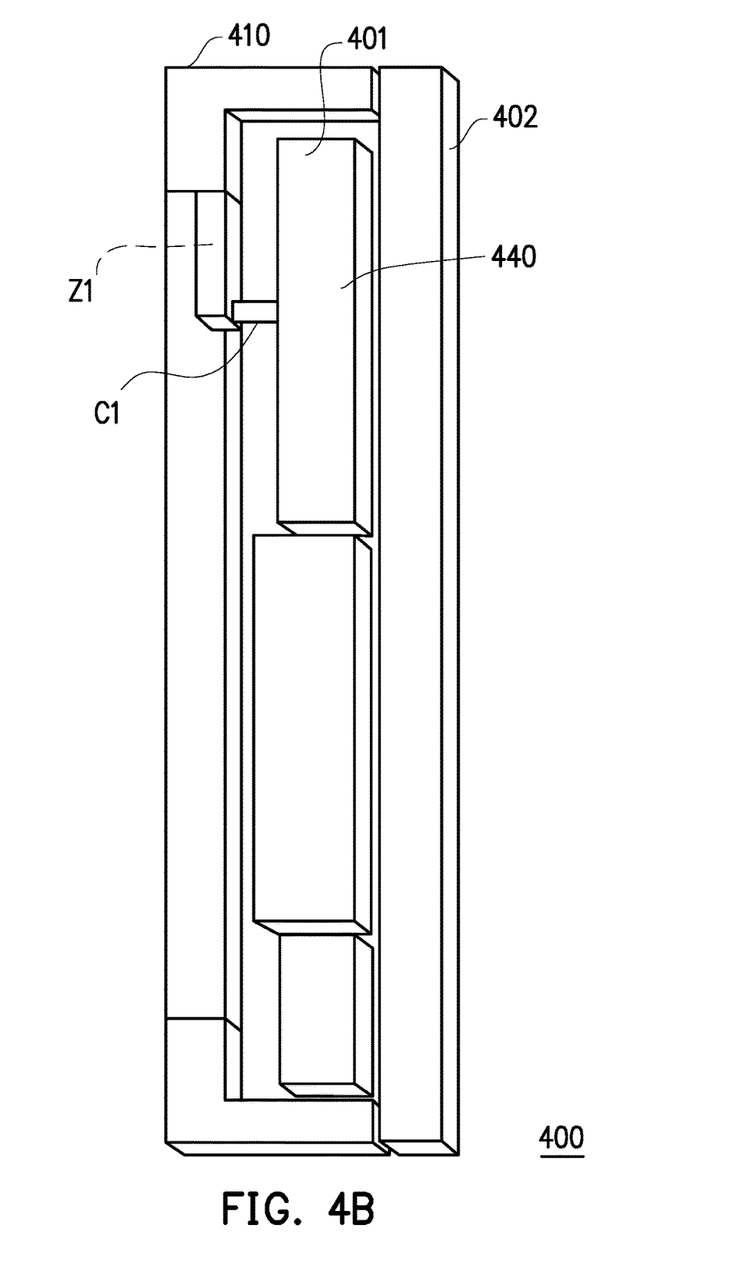
FIG. 4B is a schematic cross-sectional view illustrating the embodiment of FIG. 4A.

Referring to FIG. 4A and FIG. 4B together, FIG. 4A is a schematic illustrating a hand-held apparatus in an embodiment of the invention, and FIG. 4B is a schematic cross-sectional view of the embodiment of FIG. 4A. A hand-held apparatus 400 includes a casing 410, a controller 420, a temperature sensor 430, and a battery 440. The controller 420, the temperature sensor 430, and the battery 440 are accommodated in the casing 410. The controller 420 is coupled to the temperature sensor 430 and the battery 440. The temperature sensor 430 is coupled to the casing 410 and detects a surface temperature of the casing 410. The controller 420 is configured to: provide a power charging voltage and a power charging current to perform a power charging process to the battery 440, and receive a surface temperature provided by the temperature sensor 430 during the power charging process; activate the power charging management mechanism when the surface temperature is higher than a reference temperature and simultaneously reduce a voltage value of the power charging voltage; generate a comparing result by comparing the surface temperature with a plurality of threshold temperatures after the power charging management mechanism is activated, and adjust a current value of the power charging current based on the comparing result.

In FIG. 4B, the hand-held apparatus 400 further includes a display panel 402, a circuit board 401, and a clip C1. The display panel 402 and the casing 410 are connected with each other and form an enclosed space. The controller 420 and the temperature sensor 430 may be disposed on the circuit board 401, and the temperature sensor 430 may be buckled to a region Z1 with use of the clip C1. The temperature sensor 430 may detect a surface temperature of the region Z1 with use of the clip C1.

In conclusion of the above, the surface temperature is detected, surface temperature is compared with the reference temperature and the plurality of threshold temperatures, and the power charging voltage and the power charging current are adjusted accordingly in this invention, such that the power charging efficiency of the hand-held apparatus is effectively increased.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:
1. A method for power charging management, adapted to be applied in a hand-held apparatus, the method comprising:
   providing a power charging voltage and a power charging current to perform a power charging process to the hand-held apparatus, and simultaneously detecting a surface temperature of the hand-held apparatus during the power charging process;
   activating a power charging management mechanism when the surface temperature is higher than a reference temperature, and simultaneously reducing a voltage value of the power charging voltage; and
   generating a comparing result by comparing the surface temperature with a plurality of threshold temperatures after the power charging management mechanism is activated, and adjusting a current value of the power charging current based on the comparing result,
   wherein a current value of the power charging current is increased based on the comparing result when the surface temperature drops from higher than a first threshold temperature of the plurality of threshold temperatures to be lower than the first threshold temperature, wherein a current value of the power charging current is decreased based on the comparing result when the surface temperature rises from lower than the first threshold temperature of the plurality of threshold temperatures to be higher than the first threshold temperature, wherein the reference temperature is lower than the plurality of threshold temperatures, and temperature values of the plurality of threshold temperatures are not the same.

2. The method for power charging management of claim 1, wherein the step of activating the power charging management mechanism and simultaneously reducing a voltage value of the power charging voltage when the surface temperature is higher than the reference temperature comprises:

reducing a voltage value of the power charging voltage from a first voltage value to a second voltage value when the surface temperature is higher than the reference temperature.

3. The method for power charging management of claim 2, wherein the step of activating the power charging management mechanism and simultaneously reducing a voltage value of the power charging voltage when the surface temperature is higher than the reference temperature further comprises:

simultaneously reducing a current value of the power charging current from a first current value to a second current value.

4. The method for power charging management of claim 3, wherein the plurality of threshold temperatures form a plurality of temperature ranges; after the power charging management mechanism is activated, the step of generating the comparing result by comparing the surface temperature with the plurality of threshold temperatures and adjusting a current value of the power charging current based on the comparing result comprises:

setting a plurality of set currents respectively corresponding to the plurality of temperature ranges;
determining a set temperature range where the surface temperature falls among the plurality of temperature ranges by comparing the surface temperature with the plurality of threshold temperatures; and
selecting a set current corresponding to the set temperature range to adjust the power charging current.

5. The method for power charging management of claim 4, wherein current values of the plurality of set currents are respectively negatively correlated with temperature values of corresponding temperature ranges of the plurality of temperature ranges.

6. A hand-held apparatus, comprising:
a casing;
a battery accommodated in the casing;
a temperature sensor coupled to the casing and detecting a surface temperature of the casing; and
a controller accommodated in the casing and coupled to the battery and the temperature sensor, the controller being configured to:

provide a power charging voltage and a power charging current to perform a power charging process to the battery, and receive the surface temperature provided by the temperature sensor during the power charging process;
activate a power charging management mechanism when the surface temperature is higher than a reference temperature, and simultaneously reduce a voltage value of the power charging voltage; and
generate a comparing result by comparing the surface temperature with a plurality of threshold temperatures after the power charging management mechanism is activated, and adjust a current value of the power charging current based on the comparing result,
wherein the controller increases a current value of the power charging current based on the corresponding comparing result when the surface temperature drops from higher than a first threshold temperature of the plurality of threshold temperatures to be lower than the first threshold temperature,
wherein the controller decreases a current value of the power charging current based on the comparing result when the surface temperature rises from lower than the first threshold temperature of the plurality of threshold temperatures to be higher than the first threshold temperature,
wherein the reference temperature is lower than the plurality of threshold temperatures and temperature values of the threshold temperatures are not the same.

7. The hand-held apparatus of claim 6, wherein the controller reduces a voltage value of the power charging voltage from a first voltage value to a second voltage value when the surface temperature is higher than the reference temperature.

8. The hand-held apparatus of claim 7, wherein the controller further simultaneously reduces a current value of the power charging current from a first current value to a second current value.

9. The hand-held apparatus of claim 7, wherein the controller generates a plurality of temperature ranges based on the plurality of threshold temperatures, respectively sets a plurality of set currents corresponding to the plurality of temperature ranges, determines a set temperature range where the surface temperature falls among the plurality of temperature ranges by comparing the surface temperature with the plurality of threshold temperatures; and selects a set current corresponding to the set temperature range to adjust the power charging current.

10. The hand-held apparatus of claim 9, wherein current values of the plurality of set currents are respectively negatively correlated with temperature values of corresponding temperature ranges of the plurality of temperature ranges.

11. The hand-held apparatus of claim 6 further comprising:
a clip abutted to be buckled between the casing and the temperature sensor.

* * * * *